Figure 4:
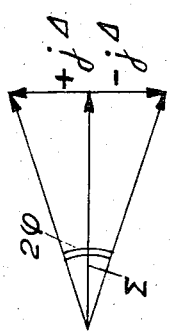

Sept. 19, 1967   H. POINSARD   3,343,166

MONOPULSE RADAR SYSTEM

Filed Oct. 28, 1965   2 Sheets-Sheet 1

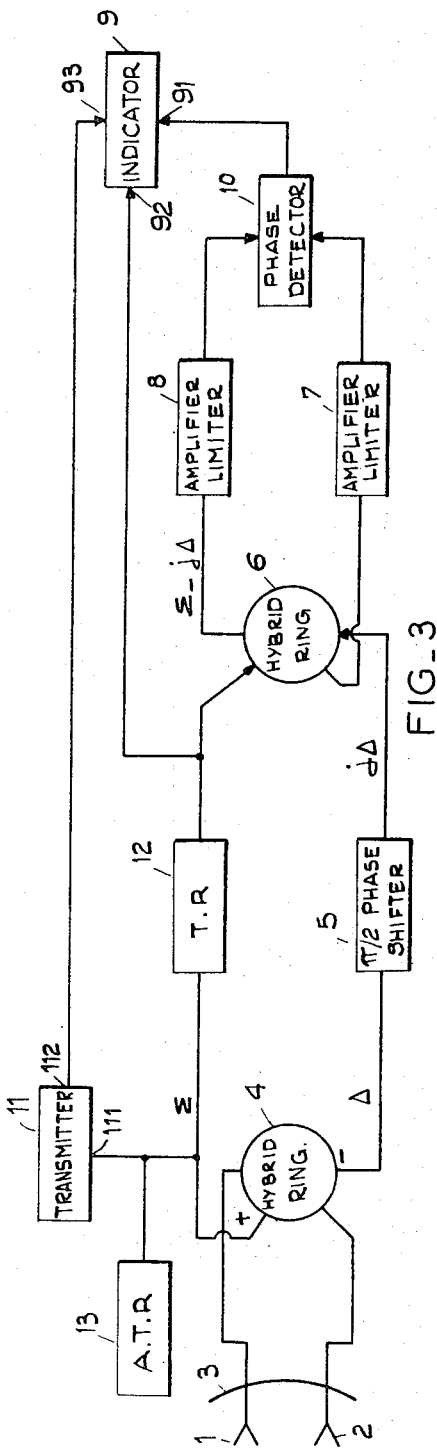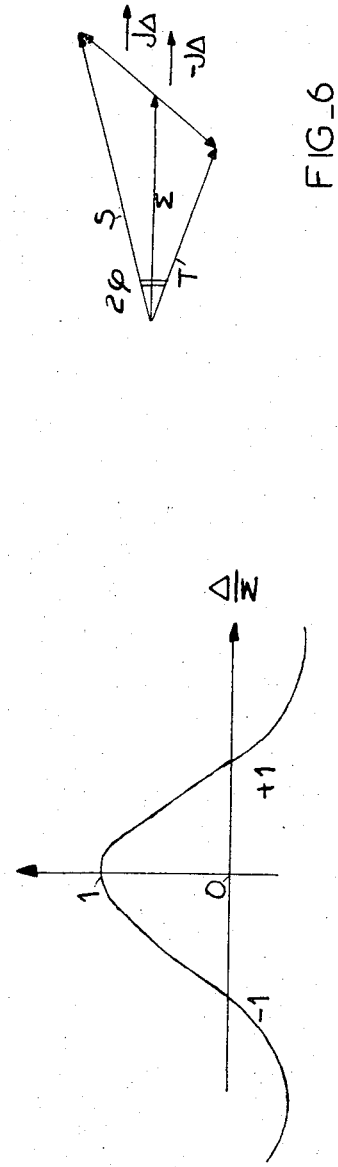

3,343,166
Patented Sept. 19, 1967

3,343,166
MONOPULSE RADAR SYSTEM
Henri Poinsard, Paris, France, assignor to CSF—Compagnie Generale de Telegraphie Sans Fil, a corporation of France
Filed Oct. 28, 1965, Ser. No. 505,536
Claims priority, application France, Nov. 9, 1964, 994,320
3 Claims. (Cl. 343—16)

The present invention relates to monopulse radar systems. More particularly it is an object of the invention to provide a system intended to be associated with a conventional monopulse radar system for making it possible to determine whether an echo comes from the region covered by the main lobe of the sum channel of the radar or from another region.

This arrangement is characterized mainly in that, where $\Sigma$ and $\Delta$ are the summation and differential signals, means are provided for making the sums $S=|\Sigma+j\Delta|$ and $T=|\Sigma-j\Delta|$, for detecting the phase difference of these two signals S and T and for supplying a signal which represents this respective phase difference, said signal being positive or negative according to whether the echo originates from the region covered by the main lobe or not, or conversely.

Figure 2:
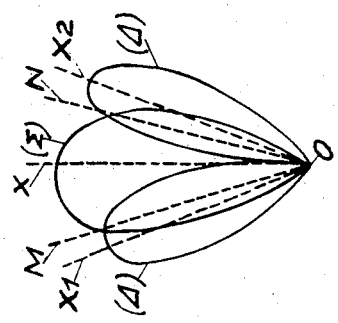
Figure 1:
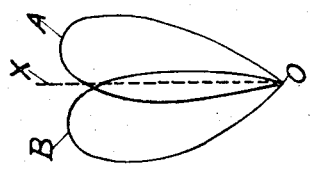

For a better understanding of the invention and to show how the same may be carried into effect reference will be made to the drawing accompanying the following description and in which:

FIG. 1 shows the radiation diagrams of a two-channel monopulse radar;
FIG. 2 shows the two diagrams $|\Sigma|$ and $|\Delta|$ of this radar;
FIG. 3 shows an embodiment of the invention; and
FIGS. 4, 5 and 6 are explanatory diagrams.

FIG. 1 shows two polar radiation diagrams A and B of a monopulse radar with two receiving channels. These two diagrams are arranged symmetrically relative to the axis O–X.

The sum diagram $|\Sigma|=|A+B|$, shown in FIG. 2 presents a maximum in the direction OX.

The difference diagram $\Delta=|A-B|$ presents a zero on the axis OX and two maxima in two directions OX1 and OX2 which are symmetrical relative to OX.

The points of intersection of the diagrams $\Sigma$ and $\Delta$, that is to say, the points for which $|\Sigma|=|\Delta|$, are located on two straight lines OM and ON, which substantially define the angle within which pointing errors, i.e. the angular deviation of the target from the axis OX which is the axis of the antenna, are to be measured.

The system according to the invention supplies a video signal coinciding in time with the received echo and the sign of which is positive if the target is within the angular zone thus defined and negative in the opposite case, or vice versa.

FIG. 3 shows an embodiment of this arrangement. It comprises a transmitter 11 having a signal output 111 and a synchronizing output 112. The signal output 111 is coupled to one of two primary sources 1 and 2 associated with a reflector 3, which supply two echo signals A and B upon the transmission of a pulse. Conventional circuits 4, well known in the art, consisting for example of a hybrid ring, and forming also part of the coupling between the transmitter and the aerial system, supply two signals $\Sigma=|A+B|$ and $\Delta=|A-B|$.

The signal $\Sigma$ and the signal $\Delta$, the latter after a phase shift by $\pi/2$ in a phase-shifter 5, are applied to a circuit 6 of conventional construction, for example again a hybrid ring, which preserves the relative phase shift and supplies at intermediate frequency two signals $\Sigma+j\Delta$ and $\Sigma-j\Delta$, wherein the symbol $j$ signifies a phase shift by $\pi/2$ of the signal $\Delta$. Conventional T.R. switch 12 and A.T.R. circuit 13 are inserted in the circuit, as shown for example in "Introduction to Monopulse," by Rhodes, page 18.

Signals $\Sigma+j\Delta$ and $\Sigma-j\Delta$ are applied to two amplifiers 7 and 8 of limited output level.

The amplifiers 7 and 8 are connected directly to a phase detector 10. The output signal of this latter is utilized as a discrimination signal applied, for example, to a control input 91 of a radar indicator 9 having a signal input 92 coupled to the sum channel and a timing input 93 coupled to the synchronization output 112 of the transmitter. The operation of the assembly is as follows:

Let $2\varphi$ be the phase shift between the signals $\Sigma+j\Delta$ and $\Sigma-j\Delta$. These two signals are shown in FIG. 4. The detector supplies the signal $\sigma=C\cos 2\varphi$. In the case of an echo from a single object, $\Sigma$ and $\Delta$ are, as is known, either in phase or in phase opposition and one may write $\varphi=\arctan \Sigma/\Delta$.

The phase detector thus supplies the signal $$\sigma=\cos 2\varphi=\cos(\arctan \Delta/\Sigma) \qquad (2)$$

$\sigma$ is an even function of $\Delta/\Sigma$ (FIG. 5). This is a video signal having a maximum for $\Delta=0$ and two zeros for $|\Delta/\Sigma|=1$.

It is positive for $|\Delta/\Sigma|<1$ and negative in the opposite case, i.e. when the target lies outside of the useful area defined by the straight lines OM and ON.

It is obvious to those skilled in the art that a similar result is obtained through applying to detector 10 signals $\Delta+j\Sigma$ and $\Delta-j\Sigma$ instead of $\Sigma+j\Delta$ and $\Sigma-j\Delta$. The signal obtained at the output of detector 10 is then equal to $\sigma'=C\cos(\pi-2\varphi)$, i.e. that $\sigma'$ is positive when $\sigma$ is negative and conversely.

In the case in which there are many echoes from objects located simultaneously in the operating field of the monopulse radar and at the same distance therefrom, the operation may be explained as follows:

Assuming that $$\vec{A} \text{ and } \vec{B}$$

are the sums of the echo signals received in the two channels from $n$ objects $E_1$ to $E_n$, located within the radar field and at the same distance therefrom $$\vec{a}_1 \text{ to } \vec{a}_n, \vec{b}_1 \text{ to } \vec{b}_n$$

being the echoes received, respectively, in the two channels on $n$ objects, one may write $$\vec{A}=\vec{a}_1+\ldots+\vec{a}_n$$
$$\vec{B}=\vec{b}_1+\ldots+\vec{b}_n$$

Setting
$$\vec{S}=\vec{\Sigma}+j\vec{\Delta}$$
$$\vec{T}=\vec{\Sigma}-j\vec{\Delta}$$

Angle $2\varphi$ in FIG. 6 represents the phase difference between $\vec{S}$ and $\vec{T}$. $\vec{\Sigma}$ and $\vec{\Delta}$ are no longer necessarily in phase or in phase opposition in the general case.

One has:

$$\vec{S}\cdot\vec{T}=|\vec{S}|\cdot|\vec{T}|\cos 2\varphi$$

or writing $$|\vec{S}|=S, |\vec{T}|=T$$

a simple calculation gives $$\sigma=\cos 2\varphi=4\frac{\vec{A}\cdot\vec{B}}{S\cdot T}$$

and setting $$|\vec{A}| = A$$
$$|\vec{B}| = B$$

it follows that $$\sigma = \cos 2\varphi = \frac{2\vec{A} \cdot \vec{B}}{\sqrt{(A^2 - B^2)^2 + (2\vec{A} \cdot \vec{A})^2}} \quad (3)$$

or else $$\sigma = \frac{1}{2} \frac{\Sigma^2 - \Delta^2}{(\Sigma \cdot \Delta)^2 + \frac{1}{4}(\Sigma^2 - \Delta^2)^2} \quad (4)$$

These two formulas are valid whether there is a single echo, i.e. in the case studied previously, or whether there is a plurality of simultaneous echoes from point-shaped objects, or whether the object is distributed in space (case of fog or rain, for example).

If $n$ echoes are superposed one has:

$$\vec{A} \cdot \vec{B} = (\vec{a_1} + \cdots \vec{a_n})(\vec{b_1} + \cdots \vec{b_n})$$
$$= \Sigma_n \vec{a_i} \cdot \vec{b_i} + \Sigma_n \vec{a_i} x \vec{b_j}$$
$$i = 1, n \; i, j = 1, n$$

in which second number $i$ differs necessarily from $j$.

The products $\vec{a_1} \cdot \vec{b_1}$ are, as shown above by Formulas 2 and 3, positive, negative or zero, according to whether the echoes $E_i$ are inside, on the boundary or outside the zone defined above.

The sign of the products $\vec{a_1} \cdot \vec{b_1}$ depends on the phase difference of the echoes. If the difference in phase varies sufficiently in time for $\vec{a_1} \cdot \vec{b_1}$ to have zero mean value, the mean of the present $\vec{A} \cdot \vec{B}$ is written $$\overline{(\vec{A} \cdot \vec{B})} = \Sigma \overline{(\vec{a_i} \cdot \vec{b_i})}$$

$$\Sigma \overline{(\vec{a_i} \cdot \vec{b_i})}$$

may also be written $$\Sigma_1 (\vec{a_i} \cdot \vec{b_i}) + \vec{a_o} \cdot \vec{b_o}$$

where $\Sigma_1$ represent the sum of the products $\vec{a_1} \cdot \vec{b_1}$ due to parasitic echoes and $\vec{a_o} \cdot \vec{b_o}$ is due to a useful echo.

When parasitic echoes originate from an object with a spatial distribution such as that of rain, the sum $\Sigma_1$ is generally negligible with respect to the product $\vec{a_o} \cdot \vec{b_o}$, since this sum comprises positive and negative terms which mutually cancel, at least partly. The sign of signal $\sigma$ still indicates whether the useful target is located inside the angular volume precedently determined or not.

Of course, this is not true if the object with the above spatial distribution lies mainly inside said angular zone or mainly outside of it. These two cases are very particular cases and thus generally it may be said that the radar system according to the invention has an improved resolving power even within the conditions outlined above.

It can be readily demonstrated that the signal $\sigma$ is zero in the case two objects are located at the same distance from the antenna on either side of the axis and in two intersecting directions of the diagrams $\Sigma$ and $\Delta$.

One has:

$$\vec{A} \cdot \vec{B} = \vec{a_1} \cdot \vec{b_1} + \vec{a_2} \cdot \vec{b_2} + \vec{a_1} \cdot \vec{b_2} + \vec{a_2} \cdot \vec{b_1}$$

Since $$\vec{a_1} \vec{b_1} = \Sigma_1^2 - \Delta_1^2 = 0$$

and also $$\vec{a_1} \cdot \vec{\Delta_2} = \Sigma_2^2 - \Delta_2^2 = 0$$

$$\vec{A} \cdot \vec{B} = \vec{a_1} \cdot \vec{b_2} + \vec{a_2} \cdot \vec{b_1}$$

has therefore zero mean value if the two echoes vary sufficiently in phase during the observation period.

The same also applies to $\sigma$ or $\sigma'$. In this case, there is an overall signal which is zero.

What is claimed is:
1. In a monopulse radar, a circuit for supplying a discrimination control signal comprising: a sum channel and a difference channel, said channels having respectively first and second outputs: $\pi/2$ phase-shifting means having an input coupled to one of said first and second outputs and said phase shifting means having an output; a sum-and-difference circuit having two inputs respectively coupled to said phase shifting means output and to that one among said first and second outputs which is not coupled to said phase-shifting means, said sum-and-difference circuit having two outputs; and phase responsive means, having two inputs respectively coupled to said sum-and-difference circuit outputs, said phase responsive means having a cosine output supplying said control signal output supplying said control signal.

2. A monopulse radar system comprising an aerial system having two radiation sources; pulse transmitting means coupled to one of said sources having a signal output and a timing control output; a sum reception channel and a difference reception channel having respective inputs respectively coupled to both said sources, and respective outputs; an indicator having a timing control input coupled to said timing output, a signal input coupled to said sum channel output, and a discrimination control input; phase-shifting means having an input coupled to the output of said difference channel and an output; a sum-difference circuit having two inputs respectively coupled to said sum channel output and to said phase-shifting means output, a sum output and a difference output; first and second amplifying and limiting means respectively coupled to said sum and difference outputs and having respective outputs; phase-detecting means having two inputs respectively coupled to said last mentioned outputs and a cosine output coupled to said control input.

3. A monopulse radar circuit having a first input for a sum signal $\Sigma$ and a second input for a difference signal $\Delta$, combining means for providing a signal $\Sigma + j\Delta$ and a signal $\Sigma - j\Delta$ where signal $j\Delta$ is derived from signal $\Delta$ by a phase-shift of $\pi/2$, and means, coupled to said combining means, and having a cosine output supplying a signal which is proportional to $\cos 2\varphi$ where $2\varphi$ is the phase angle between signals $\Sigma + j\Delta$ and $\Sigma - j\Delta$.

References Cited

UNITED STATES PATENTS 3,153,234 10/1964 Begeman et al. _____ 343—16
3,212,089 10/1965 Longacre et al. _____ 343—16

RODNEY D. BENNETT, *Primary Examiner.*

J. P. MORRIS, *Assistant Examiner.*